UNITED STATES PATENT OFFICE.

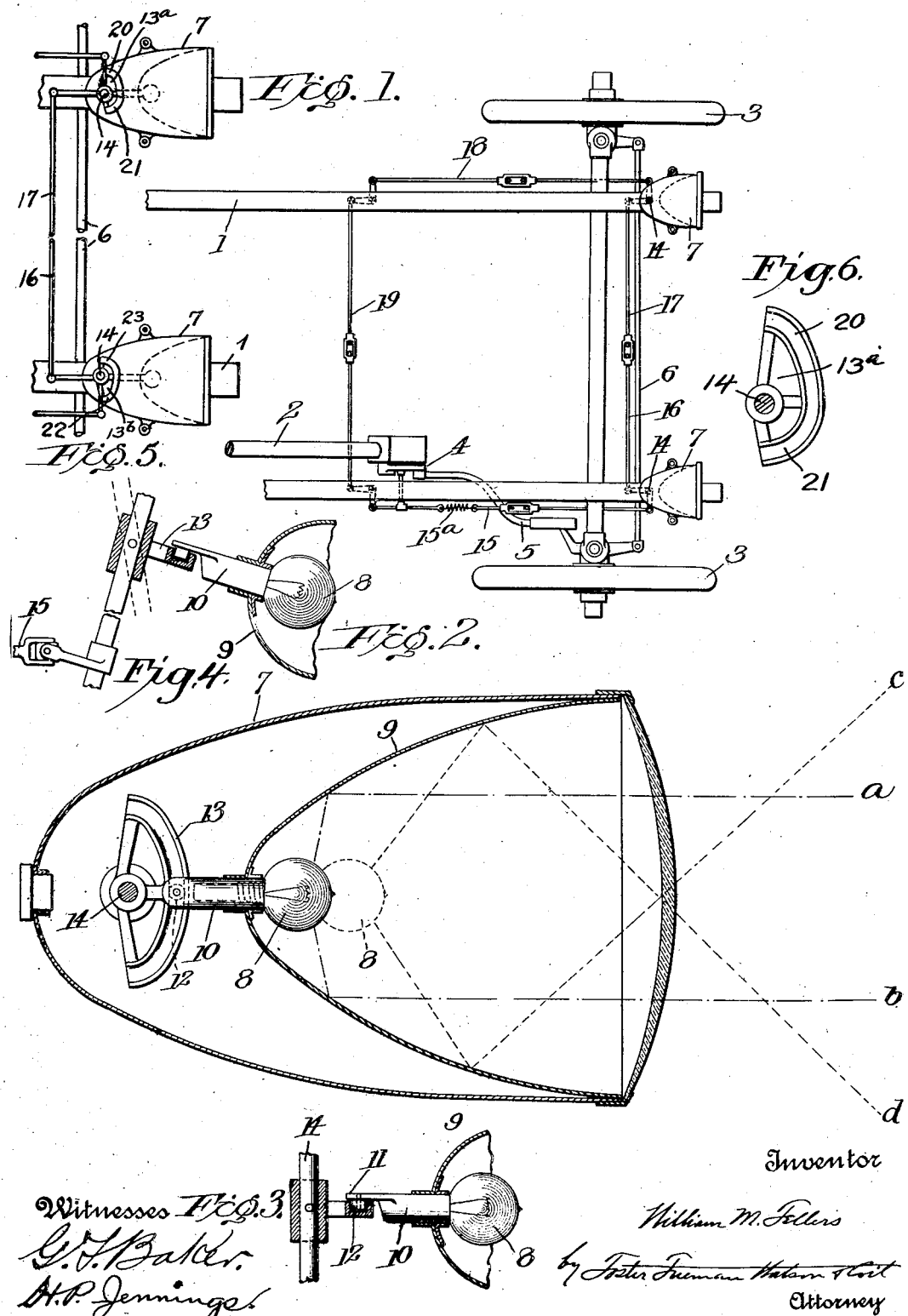

WILLIAM M. FELLERS, OF WARRINGTON, FLORIDA.

AUTOMOBILE-HEADLIGHT.

1,350,491.  Specification of Letters Patent.  Patented Aug. 24, 1920.

Application filed April 17, 1916. Serial No. 91,661.

*To all whom it may concern:*

Be it known that I, WILLIAM M. FELLERS, a citizen of the United States, residing at Warrington, Escambia county, State of Florida, have invented certain new and useful Improvements in Automobile-Headlights, of which the following is a specification.

The present invention relates to improvements in head lights for vehicles and is particularly adapted for use with motor vehicles. It has been heretofore proposed to mount the head lights of motor vehicles in such manner that the position thereof with relation to the vehicle will be automatically changed as the direction of movement of the vehicle changes. That is the head lights have been so mounted that they would turn with the steering wheels. Experience with such construction has shown, however, that while for certain purposes they are superior to the arrangement in which the head lights are relatively immovable as regards the vehicle frame, yet they do not necessarily provide the desired illumination when the vehicle is traveling in other than a straight line. For example, when a vehicle provided with a lamp which is adapted to turn with a steering wheel is rounding a curve it frequently happens that a considerable portion of the illumination furnished by a lamp is beyond the outer side of the road on which the vehicle is traveling and the portion of the road over which the adjacent wheel travels is not sufficiently illuminated.

The primary object of the present invention is to provide a construction by which the divergence of the rays from a head light will be automatically changed in accordance with changes in the direction of movement of the vehicle so that when, for example, a vehicle is making a turn or traveling on a curved road the width of the illuminated area will be greater than when the direction of movement is straight.

In the accompanying drawings,

Figure 1 is a plan view of a portion of a motor vehicle frame having one embodiment of the present invention applied thereto;

Fig. 2 is a sectional view, on an enlarged scale, through one of the head lights;

Fig. 3 is a detail view;

Fig. 4 illustrates a modification.

Fig. 5 is a diagrammatic plan view of a pair of headlights as shown in Fig. 1, on a larger scale, showing modified operating mechanism applied thereto; and Fig. 6 is a detail view of said mechanism.

Referring to the drawings, 1 represents conventionally a portion of the frame of a motor vehicle and 2 a section of the manually operable shaft by which the operator of the vehicle controls movement of the steering wheels 3.

As the parts referred to may be of any suitable construction, they are illustrated more or less conventionally. It will be understood that by operating the shaft 2 the operator, through the medium of a rocking armor lever 4 and connecting rods 5, 6, is enabled to turn the wheels 3 about vertical axes in the ordinary manner.

7 designates the casing of a head light which is suitably mounted on the frame 1 or parts supported thereby and within which, as shown, are arranged a lamp 8 and a parabolic reflector 9.

Instead of maintaining the lamp 8 and reflector 9 constantly in fixed relation, means are provided whereby it is possible to effect a relative movement between said parts. In the embodiment of the invention illustrated the electric lamp shown is mounted on a tubular support 10, which is fitted in a suitable guide at the rear end of the reflector 9 and means are provided for reciprocating the lamp and its support 10 so that the lamp may be adjusted away from and into the focus of the reflector. When the lamp is positioned substantially at the focus of the reflector, the rays therefrom will all be projected in substantial parallelism, as indicated by the lines $a$, $b$. If, however, the lamp is adjusted away from the focus of the reflector, the rays therefrom will have a greater divergence, which is more or less diagrammatically illustrated by the lines $c$, $d$.

The lamp carrier 10 is so connected with the steering devices of the vehicle that when the wheels 3 are turned in either direction about their vertical pivots the lamp will be moved from the full line position indicated in Fig. 2 or the focus of the reflector 9, to the position represented by the dotted lines. The connection between the lamp shifting means and the steering devices may be of any suitable character. In the accompanying more or less diagrammatic illustration of the invention the lamp support is provided at its rear end with an extension 11 on the lower face of which is suitably mounted an anti-friction roll 12, which fits within a groove formed in an oscillatory cam member 13. The shaft 14 on which the cam 13 is secured is provided at its lower end with a bell crank, one arm of which is connected to the lever 4 or rod 5 of the steering gear. As shown, the actuating bell crank for the head light at the right hand side of the machine is directly connected by means including a member 15 and spring 15$^a$ with the lever 4 of the steering gear and the other arm of said bell crank is connected by members 16, 17 with the corresponding actuating bell crank of the head light at the left side of the machine. The other arm of the last said bell crank is, through suitable members 18, 19 and intermediate bell cranks, connected with the rear end of the member 15. The connection between the several parts is such that the lamps of both head lights will be simultaneously similarly actuated as the steering wheels are manipulated.

It is believed that the operation of the invention and the advantages thereof will be readily understood from the foregoing description and the drawing. It will be seen that when the vehicle is traveling in a substantially straight line the lamp will be positioned at the focus of the reflector so that the rays therefrom will be projected in substantially parallel lines. When, however, the steering wheels are adjusted to guide the vehicle in a curved path, the lamps will be automatically moved forward away from the foci of the reflectors and thereby the rays will be caused to diverge to a maximum degree and the width of the area illuminated by each lamp will be considerably greater than when the parts are in the relative positions shown in full lines in the drawing. By thus increasing the extent of divergence of the rays of light the road on which the vehicle is traveling will be illuminated to a greater extent adjacent the vehicle than when the head lights are immovably mounted on the vehicle or when they are adapted to turn bodily with the steering wheels.

The mechanism controlling the head lights is relatively lighter in weight and more simple in construction than those heretofore proposed in which the lamps turn with the steering wheels. When once assembled all the operating parts work with extreme smoothness and freedom from lost motion, any slack in the members 15, 16, 17, 18 and 19 (which may be wires of suitable size) being taken up by action of the spring 15$^a$. All of the forces acting on said wires, or connecting members, are tension forces.

It will be seen that by properly shaping the groove in the member 13 the mechanism will operate so that only the lamp of the head light adjacent the outside of a curve will be moved out of focus. That is, if a portion of the groove is concentric with the axis of shaft 14, as illustrated in Figs. 5 and 6, the lamp holder 10 will not be moved relative to the reflector, except when the eccentric, or cam portion, of the groove is in engagement with the roll 12.

In Fig. 5 it will be seen that cam 13$^a$, which is shown on a larger scale in Fig. 6, has an eccentric portion of the groove 20, similar to the groove of cam 13 illustrated in Fig. 2, and a portion of the groove, 21, which is concentric with the axis of shaft 14. It will also be seen that cam 13$^b$ has a portion of the groove, 22, similar to the portion 20 of the groove of cam 13$^a$ but on the opposite side of the shaft 14, and a concentric portion of the groove, 23. It will be noted that the eccentric portions of the grooves 20 and 22, of the two cams extend outwardly from the vehicle and the concentric portions of the grooves, 21 and 23, extend inwardly toward each other. Thus when the vehicle turns from one side or the other, the lamp adjacent the side toward which the vehicle is turning, will be affected by the movement of its cam.

As shown in Figs. 2 and 3, the lamps are moved horizontally as the steering wheels turn. By arranging the carrier 10 at an inclination to the plane of the wheel base, as shown in Fig. 4, the lamp may be simultaneously moved from the focus of the reflector and transversely of the central axis of the reflector so that, for example, more light rays will be directed downward than upward.

In case the focus of the reflector is sufficiently far from the rear end thereof, the lamp may be adjusted rearward instead of forward to carry it out of said focus.

Having thus described the invention, what is claimed and desired to be secured by Letters Patent is:

1. The combination with an automobile, of a headlight comprising a lamp and a parabolic reflector, an oscillating cam adapted to effect relative movement between the lamp and the reflector, and connections between the steering gear of the automobile and said cam whereby the cam is actuated in accordance with the direction of movement of the automobile, for the purpose described.

2. The combination with an automobile, of a headlight carried thereby and comprising a lamp and a parabolic reflector, a vertical shaft connected with the steering gear of the automobile, a cam mounted upon said shaft and connected to the lamp whereby the latter is automatically moved with respect to the reflector when the automobile deviates from a straight path, for the purpose described.

3. The combination with an automobile, of two head lights with parabolic reflectors and electric lamps mounted for relative longitudinal movement with respect to the reflectors, means for effecting relative movement of one lamp only and its reflector when the automobile is turned from a straight path in one direction, and means arranged to move the other lamp only when the automobile is turned in the other direction.

4. The combination with a vehicle of a headlight with a lamp and a curved reflector, and means for automatically moving said lamp out of focus with its reflector when the automobile changes direction from a straight to a curved path, said means comprising a cam adapted to effect relative movement between the lamp and reflector, and a connection between the steering gear of the automobile and said cam.

5. The combination with an automobile of two headlights with lamps and curved reflectors, and means for automatically moving either one of said lamps out of focus with its reflector when the automobile changes direction from a straight to a curved path, said means including two cams each operatively connected to one of the lamps and each formed to move the corresponding lamp when the automobile turns in one direction and to permit the lamp to remain at the focus of the reflector when the automobile turns in the other direction, said cams being oppositely formed for the purpose set forth.

In testimony whereof I affix my signature.

WILLIAM M. FELLERS.